Patented Mar. 21, 1950

2,501,042

UNITED STATES PATENT OFFICE 2,501,042

PRODUCTION OF PROPIONALDEHYDE

James L. Gear, Cumberland, Md., assignor to Celanese Corporation of America, a corporation of Delaware No Drawing. Application April 14, 1947, Serial No. 741,411

2 Claims. (Cl. 260—603)

This invention relates to the production of propionaldehyde by the vapor phase dehydration of 1,2-propylene glycol.

An object of this invention is the provision of an improved process for the catalytic vapor phase dehydration of 1,2-propylene glycol whereby propionaldehyde may be obtained in high purity and yield.

Other objects of this invention will appear from the following detailed description.

The dehydration of 1,2-propylene glycol to propionaldehyde may be effected in the liquid phase by heating the same with dilute sulfuric acid or with very dilute hydrochloric acid. Vapor phase dehydration employing pumice or alumina as the dehydration catalyst has also been effected. However, numerous side-reactions take place during said catalytic dehydration reactions with the formation of substantial quantities of acetone, methacrylaldehyde, acetals, etc., thus greatly decreasing the yield and purity of the desired propionaldehyde.

I have now found that the catalytic vapor-phase dehydration of 1,2-propylene glycol to propionaldehyde may be effected with a minimum of side-reactions and propionaldehyde obtained in high yield and increased purity if the said vapor phase dehydration reaction is carried out at temperatures of about 800 to 1100° F. employing steam as a diluent and silicon dioxide, mono-sodium phosphate, or a mixture of silicon dioxide and mono-sodium phosphate as the dehydration catalyst. When either silicon dioxide or mono-sodium phosphate are employed singly an inert carrier such as pumice is usually provided to support said materials. When a mixture of mono-sodium phosphate and silicon dioxide is employed, an inert supporting material such as pumice is not necessary. Optimum results are achieved when the temperature is maintained at 950 to 1100° F., employing a feed comprising a 10 to 20% by weight aqueous solution of 1,2-propylene glycol and a catalyst comprising a mixture of about equal parts by weight of mono-sodium phosphate and silicon dioxide.

I have also found that the space velocity, or the rate of feed in proportion to the amount of catalyst present, is highly critical if maximum yields are to be obtained. Thus, where the space velocity is low, i. e. a relatively large catalyst bed is employed together with a relatively low feed rate, a low conversion of the glycol and low yield of propionaldehyde is obtained and large amounts of allyl alcohol are produced together with some acetals and some decomposition products. Too great a feed rate, i. e. too high a concentration of the 1,2-propylene glycol in the aqueous feed, or too high a feed rate at any particular concentration of 1,2-propylene glycol in the feed, also results in a lowering of the conversion rate and yield and in the production of undesirable by-products. When employing a feed comprising a 10 to 20% by weight aqueous solution of 1,2-propylene glycol, I have found that highly advantageous results are obtained where the space velocity of the vaporized feed is about 30 to 60. Optimum results are obtained with said feed when the space velocity is from about 35 to 50. The space velocity is expressed in terms of volume or number of cubic centimeters of vaporized feed at standard conditions of temperature and pressure, i. e. 0° C. and 760 mm. pressure per volume or number of cubic centimeters of catalyst present per unit time, i. e. per hour.

In order further to illustrate my invention, but without being limited thereto, the following examples are given:

Example I

An aqueous solution containing 20% by weight of 1,2-propylene glycol is vaporized and the vapors fed at a space velocity of 48.34 to a reaction zone heated to 970° F. and containing a mono-sodium phosphate-silicon dioxide dehydration catalyst. The catalyst in the reaction zone is formed by baking or fusing a mixture of equal parts by weight of mono-sodium phosphate and silicon dioxide and breaking the product into small pieces averaging about $\tfrac{1}{16}$ inch in diameter. The dehydration reaction converts 92% of the feed, giving a 95% yield of propionaldehyde. Small amounts of allyl alcohol are also formed.

Example II

An aqueous solution containing 20% by weight of 1,2-propylene glycol is vaporized and the vapors are fed at a space velocity of 46.3 to a reaction zone heated to 1050° F. and containing a catalyst comprising silicon dioxide on pumice. The catalyst in the reaction zone is formed by mixing equal parts by weight of pumice and silicon dioxide together, adding a small amount of water and stirring while heating until dry. The mixture is broken into small lumps and charged into the reaction tube employed. The dehydration reaction converts 86.3% of the feed, giving and 89.8% yield of propionaldehyde. Small amounts of allyl alcohol are also formed.

Example III

An aqueous solution containing 20% by weight of 1,2-propylene glycol is vaporized and the vapors fed to a reaction zone heated to 950° F. The reaction zone contains a catalyst comprising mono-sodium phosphate on pumice. The rate of feed is adjusted so that the space velocity is 38.6. The catalyst employed is formed by mixing together equal parts by weight of pumice and monosodium phosphate, adding a small amount of water and stirring the mixture while heating until all visible water has been evaporated. The catalyst is then baked for two hours at 300° F. and then broken into small lumps which are charged into the reaction tube. The dehydration reaction converts 86.3% of the feed, giving an 89.8% yield of propionaldehyde. Small amounts of allyl alcohol are also formed.

The dehydration product comprising propionaldehyde, allyl alcohol and any other products formed is obtained by passing the vapors from the reaction zone through a series of condensers. The first two condensers are water cooled and the third condenser is cooled with solid carbon dioxide so that the vapors of any light boiling materials are completely condensed. The several condensation products may then be fractionated.

It is to be understood that the foregoing detailed description is given merely by way of illustration and that many variations may be made therein without departing from the spirit of my invention.

Having described my invention, what I desire to secure by Letters Patent is:

1. Process for the catalytic vapor phase dehydration of 1,2-propylene glycol to propionaldehyde, which consists essentially in vaporizing a 10 to 20% by weight aqueous solution of 1,2-propylene glycol, and passing said vapors over a dehydration catalyst comprising a mixture of about equal parts by weight of mono-sodium phosphate and silicon dioxide at a reaction temperature of about 800 to 1100° F. and at a space velocity of 30 to 60.

2. Process for the catalytic vapor phase dehydration of 1,2-propylene glycol to propionaldehyde, which consists essentially in vaporizing an aqueous solution containing about 20% by weight of 1,2-propylene glycol, and passing said vapors over a dehydration catalyst comprising a mixture of about equal parts by weight of mono-sodium phosphate and silicon dioxide at a reaction temperature of about 800 to 1100° F. and at a space velocity of 35 to 50.

JAMES L. GEAR.

REFERENCES CITED

The following references are of record in the file of this patent:

UNITED STATES PATENTS

| Number | Name | Date |
|---|---|---|
| 1,916,743 | Schwenk | July 4, 1933 |
| 2,042,224 | Groll et al. | May 26, 1936 |
| 2,083,877 | Steck et al. | June 15, 1937 |
| 2,335,238 | Dreyfus | Nov. 30, 1943 |

FOREIGN PATENTS

| Number | Country | Date |
|---|---|---|
| 539,030 | Great Britain | of 1941 |